United States Patent
Pillai

(10) Patent No.: US 11,777,925 B2
(45) Date of Patent: Oct. 3, 2023

(54) SYSTEM, METHOD, AND PROGRAM PRODUCT USING EPHEMERAL IDENTITY FOR DIGITAL USER IDENTIFICATION

(71) Applicant: Manomohan Pillai, Chantilly, VA (US)

(72) Inventor: Manomohan Pillai, Chantilly, VA (US)

( * ) Notice: Subject to any disclaimer, the term of this patent is extended or adjusted under 35 U.S.C. 154(b) by 0 days.

(21) Appl. No.: 16/893,257

(22) Filed: Jun. 4, 2020

(65) Prior Publication Data

US 2021/0320914 A1  Oct. 14, 2021

Related U.S. Application Data

(60) Provisional application No. 63/008,753, filed on Apr. 12, 2020.

(51) Int. Cl.
*H04L 9/40* (2022.01)
*G06F 21/45* (2013.01)

(52) U.S. Cl.
CPC .......... *H04L 63/0846* (2013.01); *G06F 21/45* (2013.01)

(58) Field of Classification Search
None
See application file for complete search history.

(56) References Cited

U.S. PATENT DOCUMENTS

| 11,218,409 B2* | 1/2022 | Munson | H04L 63/0428 |
|---|---|---|---|
| 2005/0234803 A1* | 10/2005 | Zhang | G06Q 40/06 |
| | | | 705/37 |
| 2005/0234804 A1* | 10/2005 | Fang | G06Q 40/04 |
| | | | 705/37 |
| 2008/0244038 A1* | 10/2008 | Martinez | H04L 67/34 |
| | | | 709/218 |
| 2013/0346302 A1* | 12/2013 | Purves | G06Q 20/108 |
| | | | 705/40 |
| 2015/0019944 A1* | 1/2015 | Kalgi | H04L 67/20 |
| | | | 715/205 |
| 2016/0125474 A1* | 5/2016 | Hoffman | G06Q 30/0267 |
| | | | 705/14.64 |
| 2016/0127875 A1* | 5/2016 | Zampini, II | G01S 5/00 |
| | | | 370/311 |
| 2017/0346851 A1* | 11/2017 | Drake | H04L 63/0428 |
| 2019/0087432 A1* | 3/2019 | Sion | G06F 16/2246 |
| 2019/0132815 A1* | 5/2019 | Zampini, II | G06Q 50/06 |
| 2020/0120023 A1* | 4/2020 | Munson | H04L 45/14 |

* cited by examiner

*Primary Examiner* — Kaveh Abrishamkar
(74) *Attorney, Agent, or Firm* — Ariel S. Bentolila; Bay Area IP Group, LLC

(57) ABSTRACT

A system and method including the steps of: generating an ephemeral ID (EID) with a client library, the EID comprises a temporary ID generated using a pseudorandom function that is configured to calculate the EID based on a linear congruential algorithm (LCG), wherein the EID changes or rotates for each loaded web page; transmitting the EID to a privacy mediation service; transmitting the EID to a programmatic advertising supply side platform where a buy side platform obtains the EID via real time bidding (RTB) calls, in which the privacy mediation service resolves the EID to a TID and return a behavioral profile or data encoded as audience segment to the buy side platform for bidding purposes.

17 Claims, 11 Drawing Sheets

SYSTEM, METHOD, AND PROGRAM PRODUCT USING EPHEMERAL IDENTITY FOR DIGITAL USER IDENTIFICATION

CROSS-REFERENCE TO RELATED APPLICATIONS

The present Utility patent application claims priority benefit of the U.S. provisional application for patent Ser. No. 63/008,753 entitled "Systems and methods for programmatic Ad targeting and measurement without the use of third party cookies" filed on 12 Apr. 2020 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to real-time bidding (RTB) systems. More particularly, certain embodiments of the invention relate to automated buying and selling of online advertising.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Advertisers currently use a real-time bidding (RTB) system to bid and deliver display advertisements (Ad Impressions) to a user on publisher web sites or mobile applications. The decision to make a bid is based on pseudo anonymous cookies (A small text stored in the user's computer that is created by a website) with behavioral data segments associated with it). Popular web browsers allow 3rd party domain cookies (cookies that are set by a website other than the one the user is currently visiting) i.e., cookies that are set by entities other than the website owner, such as ad networks, that then track user browsing behavior across the web. With rising privacy concerns, popular browsers are either blocking or have announced plans to disallow 3rd party cookies. Most brands and publishers are looking for ways to digitally identify users and their behavioral patterns across the web to create audiences in a data-privacy compliant way that won't get crippled by any anti-tracking changes made by the browsers in order to enable behavioral advertising on the web.

It is known the art, in accordance with the HTTP protocol, for a server identified by a given domain name to store one or more cookies on the client machine of an end-user visiting a website hosted by that server. The cookie contains typically data relevant to the client or to the end-user, such as state information for a given web session, a record of visits, purchases, and/or other past activities on the website by the end-user. Further, a cookie might contain a unique identifier for the client, allowing them to identified and tracked on subsequent visits (sometimes referred to as an ID cookie). Whatever information the cookie(s) might store, when the client returns to the website, it sends its cookies to the server and thereby enables the server to access the stored data. According to convention, a server sets a cookie to be accessible only within the host domain (e.g., foo-A.com or shoppingcart.foo-A.com, etc.). The cookie's scope may also be limited to a particular path (e.g., /user) within the domain. Thus, the cookie's domain and path determine the scope of the cookie, and they tell the client that the cookie should only be sent back to a server hosting the stated domain and path, e.g., as part of the client's content request to that server. This generally means that cookies set in one domain are not accessible to hosts in another domain. In some cases, however, there is a need to synchronize cookies across domains. For example, in the online advertising industry, bidders and ad exchanges often need to synchronize ID cookies so that in online auctions for advertising space managed by the ad exchange, the bidder can identify a particular client internally given the ad exchange's identifier. As another example, a website owner may need to synchronize cookies with an outside analytics service, so that the analytics service can identify a particular client internally given the website owner's identifier. Further a website owner may operate a multi-domain site, and need to synchronize cookies across those disparate domains. As a result, certain cookie synchronization techniques have been developed.

Digital publishers and advertisers are looking for alternative mechanisms to provide personalized content and advertising without the use of third party cookies, restore consumer confidence by providing greater transparency and control.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
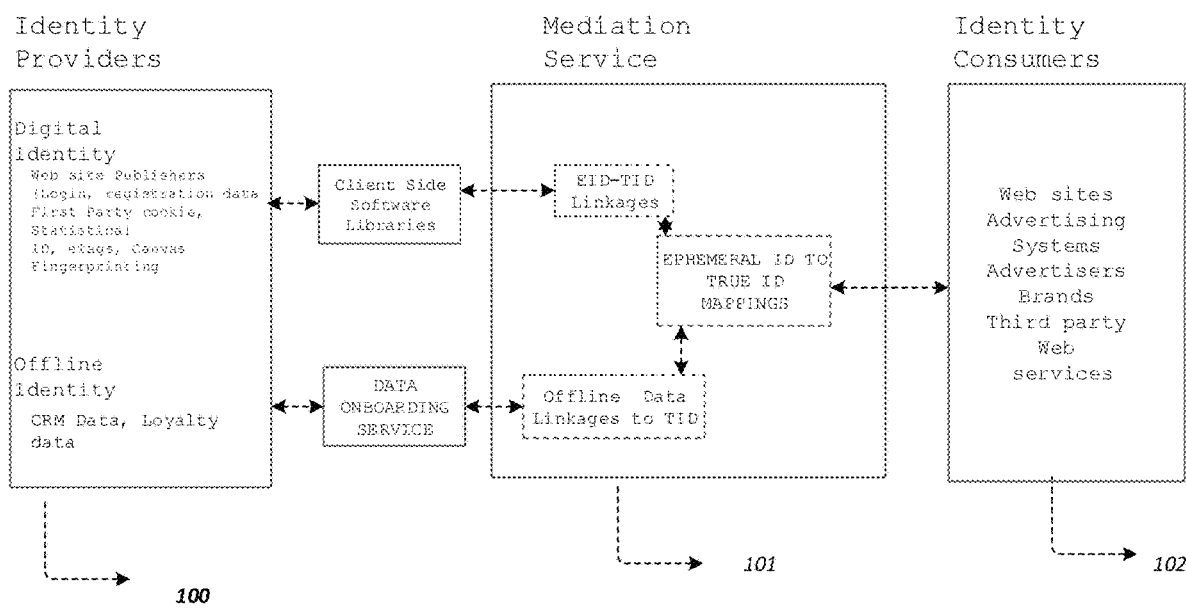
FIG. 1 illustrates an exemplary framework, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

The following terminology may be used to describe several aspects of the present invention.

Data onboarding is the process of transferring offline data to an online environment for marketing needs. Data onboarding is mainly used to connect offline customer records with online users by matching identifying information gathered from offline datasets to retrieve the same customers in an online audience Real-time bidding (RTB) is a means by which advertising inventory is bought and sold on a per-impression basis, via programmatic instantaneous auction, similar to financial markets. With real-time bidding, advertising buyers bid on an impression and, if the bid is won, the buyer's ad is instantly displayed on the publisher's site.

Programmatic advertising is the automated buying and selling of online advertising.

Behavioral advertising is a technique used by online advertisers to present targeted ads to consumers by collecting information about their browsing behavior. Several pieces of data may be used, such as: The pages browsed on a website. The time spent on the site.

A supply-side platform (SSP) or sell-side platform is a technology platform to enable web publishers or media owners to manage their advertising space inventory, fill it with ads, and receive revenue. Many of the larger web publishers of the world use a supply-side platform to automate and optimize the selling of their online media space. A supply-side platform interfaces on the publisher side to advertising networks and exchanges, which in turn interface to demand-side platforms (DSP) on the advertiser side.

An ad exchange is a technology platform that facilitates the buying and selling of media advertising inventory from multiple ad networks. Prices for the inventory are determined through real-time bidding (RTB). The approach is technology-driven as opposed to the historical approach of negotiating price on media inventory.

A Demand Side Platform (DSP) is an automated buying platform, where advertisers and agencies go to purchase digital ad inventory. Examples of ad inventory include banner ads on websites, mobile ads on apps and the mobile web, and in-stream video. DSPs are integrated into multiple ad exchanges.

Header bidding is a new, unified auction conducted by publishers outside of their primary ad server, which allows advertisers to cherry-pick impressions at the highest priority. This is sometimes called "first look."

The Google Publisher Tag (GPT) is an ad tagging library for Google Ad Manager which is used to dynamically build ad requests. It takes key details from you (such as ad unit code, ad size, and custom targeting), builds the request, and displays the ad on web pages.

An HTTP cookie (web cookie, browser cookie) is a small piece of data that a server sends to the user's web browser. The browser may store it and send it back with the next request to the same server. Typically, it's used to tell if two requests came from the same browser—keeping a user logged-in, for example.

A first-party cookie refers to a cookie created by the domain that a web user is visiting. When a user clicks on a website from a web browser, for example, that browser sends a web request in the first context, a process which entails a high level of trust that the user is directly interacting with the website.

A third-party cookie is one that is placed on a user's hard disk by a Web site from a domain other than the one a user is visiting. As with standard cookies, third-party cookies are placed so that a site can remember something about you at a later time.

Cookie churn or cookie churn rate is the rate at which cookies are deleted from user's browser over a period of time, usually weeks or months. Cookie churn is important in experiments where the users cannot be uniquely identified across browsers and devices and the only way to persist an experiment treatment across sessions is to rely on a cookie identifier. This is an issue since once a cookie is deleted and a user returns to the website they will get a new cookie ID and be randomized again and may be assigned to a different test group, polluting the data.

The HTTP state management mechanism specifies a way to create a stateful session with HTTP requests and responses. Generally, HTTP request/response pairs are independent of each other. However, the state management mechanism enables clients and servers that can exchange state information to put these pairs in a larger context, which is called a session. The state information used to create and maintain the session is called a cookie. A cookie is a piece of data that can be stored in a browser's cache. If you visit a web site and then revisit it, the cookie data can be used to identify you as a return visitor. Cookies enable state information, such as an online shopping cart, to be remembered. A cookie can be short term, holding data for a single web session that is, until you close the browser, or a cookie can be longer term, holding data for a week or a year.

A web beacon (also called web bug, tracking bug, tag, web tag, page tag, tracking pixel, pixel tag, 1×1 GIF, or clear GIF) is one of various techniques used on web pages and email, to unobtrusively (usually invisibly) allow checking that a user has accessed some content. Web beacons are typically used by third parties to monitor the activity of users at a web site for the purpose of web analytics or page tagging. They can also be used for email tracking. When implemented using JavaScript, they may be called JavaScript tags. Using such beacons, companies and organizations can track the online behavior of web users. At first, the companies doing such tracking were mainly advertisers or web analytics companies; later social media sites also started to use such tracking techniques, for instance through the use of buttons which act as tracking beacons.

Advertising inventory is the number of advertisements, or amount of ad space, a publisher has available to sell to an advertiser. Ad inventory is often calculated by the month. The term can refer to ads in print or other traditional media but is increasingly used to refer to online or mobile ads. Online ad inventory is often valued in terms of the site traffic or ad views that the publisher can deliver to the advertiser.

An impression is when an ad is fetched from its source, and is countable. Whether the ad is clicked is not taken into account. Each time an ad is fetched, it is counted as one impression.

Audience segmentation (Data Segments/Audience Segments, Segment Identifiers, Segment_id) is the process of dividing website visitors into subgroups based on a common set of characteristics such as behavior, psychographics, demographics, and customer type. Visitor segments are the fuel that drives marketing analysis, testing, optimization and personalization efforts. These targeted groups allow marketers to see what and who is driving the end-result. The identity providers (websites) provide the segmented user data (Audience data or Audience Segments or Segment_ID) associated to make audience targeting decisions. The audience segmentation follows a common Industry standard taxonomy published by the Interactive Advertising Bureau (IAB).

Statistical Id may refer to using information passed by the device, browser, app or operating system, infer a user ID which can then be used by publishers or third parties to manage state. Statistical identification of devices works across multiple apps or programs on a single device. It establishes state that is tied to a specific device, which is accessible to multiple third parties provided they are using the same algorithm.

An Ephemeral Ad ID (EID) is a temporary ID that is generated on every page load by a piece of JavaScript code that is embedded on the publisher website or a client side library that can be implemented by browser vendors or operating system (OS) vendors. Ephemeral ID (EID) is temporary in nature and has a time to live TTL of a few minutes or can be configured.

True ID (TID) is an ID that corresponds to the actual profile ID of the user. A unique True ID is assigned by the publisher when the user visits the web page. Alternatively, True ID (TID) may be assigned when the user registers for the service. True ID (TID) can also be assigned by service providers such as telecom carriers or anyone having a first party relationship with the user and has permissions to use the user data for advertising purposes.

Customers have made it a common practice to maintain user accounts with different service providers or publishers to access a range of services. Third ($3^{rd}$) party data companies have a means of linking a person's fractional digital identifiers that are shared with different service providers or web publishers to a true user profile. A full profile of the user is created by linking a person's digital identity and attributes, stored across multiple distinct identity systems or across multiple web sites for a unified view of the user profile. The system combines fractional identity attributes belonging to the same individual from multiple identity systems or multiple web sites. 3rd party Identity can be offline data only or offline data that is on boarded to digital identifiers such as a first party cookie identifier or a mobile ID for advertising (IDFA) provided by iOS or an Ad ID that is provided by the Android operating system.

Identity Linkage is a method of linking a user's offline identifiers such as Name, address, email, phone number or identity profiles created by the publisher or third parties with digital Identifiers such as Cookie ID or mobile Advertising Identifiers such as Apple's ID for Advertising (IDFA) or Google Ad ID. The linkages in this disclosure pertains to linking the identity data with True ID (TID) that the publisher generates using a common linkage key.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys. Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003) Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys. Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit —"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s)/way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

While embodiments herein may be discussed in terms of a processor having a certain number of bit instructions/data, those skilled in the art will know others that may be suitable such as 16 bits, 32 bits, 64 bits, 128s or 256 bit processors or processing, which can usually alternatively be used. Where a specified logical sense is used, the opposite logical sense is also intended to be encompassed.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium may include, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

The present invention will now be described in detail with reference to embodiments thereof as illustrated in the accompanying drawings.

FIG. 1 illustrates an exemplary framework, in accordance with an embodiment of the present invention. Identity providers 100 may associate a user's identity data with mediation service 101. The user's data may be a digital identity associated with a web site publisher, such as, but not limited to, login information, registration data, first party cookies, statistical ID, eTags, canvas fingerprinting, etc. or an offline identity such as, but not limited to, customer relationship management (CRM) data, loyalty data, etc. For digital user identities, identity providers 100 may use client side software libraries to pass the digital user identity data to mediation service 101, which may in turn create ephemeral ID (EID) to true ID (TID) linkages. For offline user identities, identity providers 100 may use a data onboarding service to pass the offline user identity data to mediation service 101, which may in turn create offline data linkages to a TID. Mediation service 101 may then create ephemeral ID (EID) to true ID (TID) mappings, masking true identity data with single use identifiers and providing data to identity consumers 102 such as, but not limited to, a brand advertiser, an advertisement buy side, demand side platform, other third party web services, etc.

Figure 2:
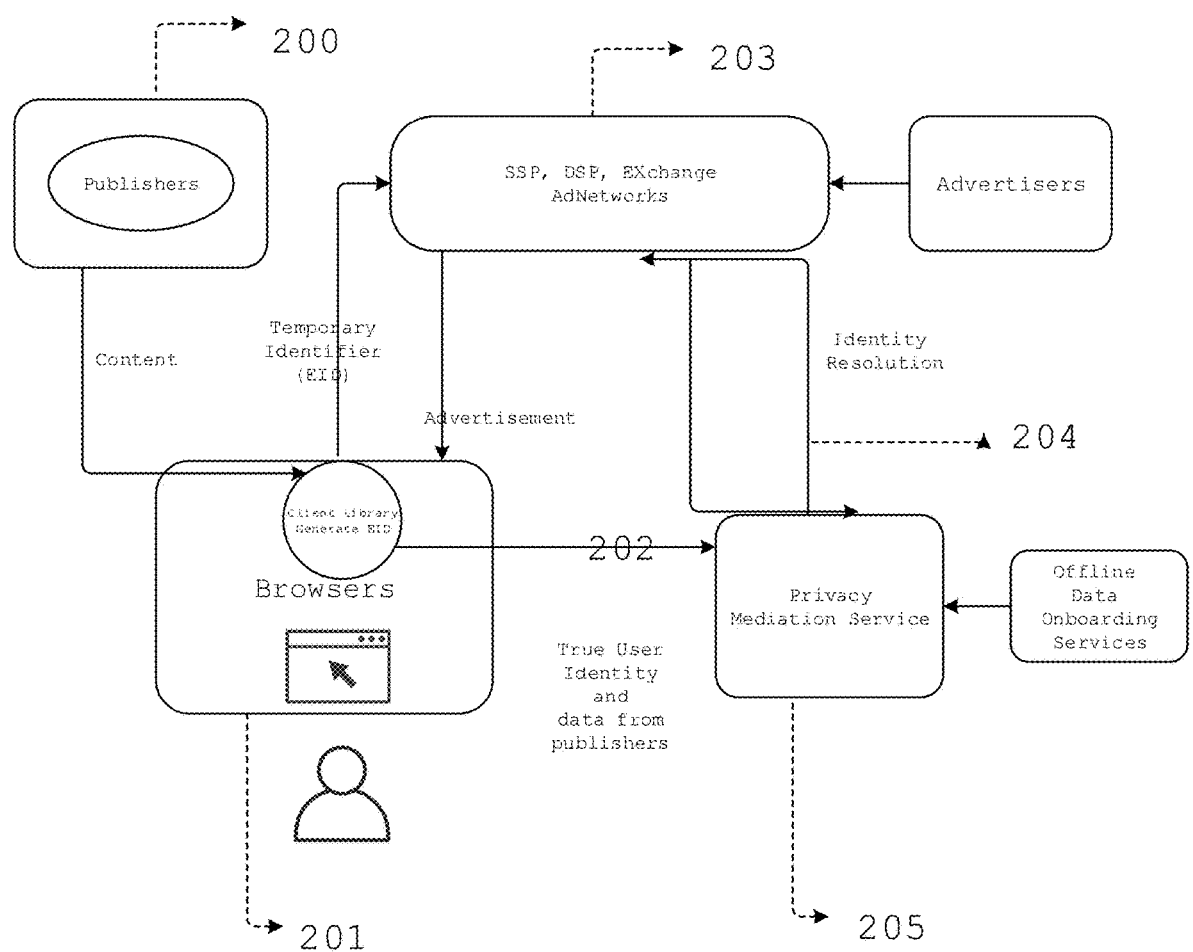
FIG. 2 illustrates a block diagram depicting an exemplary generation of an ephemeral ID (EID) and data flow from publisher to the mediation service and from a publisher web page to real time bidding (RTB) advertising systems, in accordance with an embodiment of the present invention.

FIG. 2 illustrates a block diagram depicting an exemplary generation of an EID and data flow from publisher to the mediation service and from a publisher web page to RTB advertising systems, in accordance with an embodiment of the present invention. Publishers 200 may implement a client library, which may be, for example, a JavaScript code if on a website or software development kit (SDK) if using a mobile app. When a user loads a web page in a client side browser 201, a JavaScript program may execute and generate a temporary EID. EID may be generated by a random or pseudorandom function or a method that calculates the ID based on a linear congruential algorithm (LCG) for each page load. A linear congruential generator (LCG) may comprise an algorithm that yields a sequence of pseudo-randomized numbers calculated with a discontinuous piecewise linear equation. If on a mobile app, when the user opens the app, the SDK may generate the temporary ID (EID). In parallel, the client side software program may also allow publishers 200 to make an asynchronous application programming interface (API) call to privacy mediation service 205, passing data 202 such as the EID along with a TID, associated audience segmentation data based on IAB taxonomy, and a linkage key, which may be, for example, without limitation, a hashed email address, name, address, phone number, etc. The EID may then be sent to programmatic advertising supply side platforms 203 for the buy side to bid for the impression for an ad placement. Existing advertising tags such as, but not limited to, Google Publisher Tag, Header Bidding tag, prebid.js, etc. may be used for this purpose. The buy side, advertiser, or demand side platforms (DSP) may obtain the EID via real time bidding (RTB) calls. The buy side may make an API call to privacy mediation service 205, which may resolve the EID to its TID and return a behavioral profile or data encoded as audience segments to the buy side for bidding purposes. Privacy mediation service 205 may act as a middle man between the publishers, i.e. sell side, and the advertiser, i.e. buy side, or any other third party data platform obfuscating the actual web user identification data. The buy side can thus deliver relevant targeted advertisement to the user in near real-time without the use of third party cookies or needing to expose TIDs, resulting in a high degree of privacy and security to consumers.

In an alternative embodiment, the EID may be linked to a service provider who has a consumer identity. For example, without limitation, a telecom carrier may have a billing relationship with a consumer and thus have a carrier token or identifier to identify their users when the users are on a telecom career connection. In this scenario, the telecom carrier may provide EID to TID mappings to the mediation service.

Alternatively, an operating system or browser can implement a client side library that generates the EID and provides the publisher ad server an EID to a unique browser identifier or a unique system identifier, which may then serve as the TID that the mediation server will receive from the web publisher.

In another alternative embodiment, the TID can be derived of a statistical identifier generated by browser fingerprinting techniques. The TID may also be derived using HyperText Markup Language (HTML) canvas fingerprinting techniques or by using http Etag.

An EID may be linked to multiple TID's, as it may be common for customers to maintain user accounts with different service providers or publishers to access a range of services. A user's fractional digital identifiers that are shared with different service providers or web properties may be linked, creating a unified identity profile of the user. The mediation service may maintain the mappings of TID provided by publishers to the TID that a privacy mediation service algorithmically derives based on identity federation and audience data segments across multiple identity providers, such as, but not limited to, publishers, third party data providers, carrier identity, OS or browser identifiers.

Figure 3:
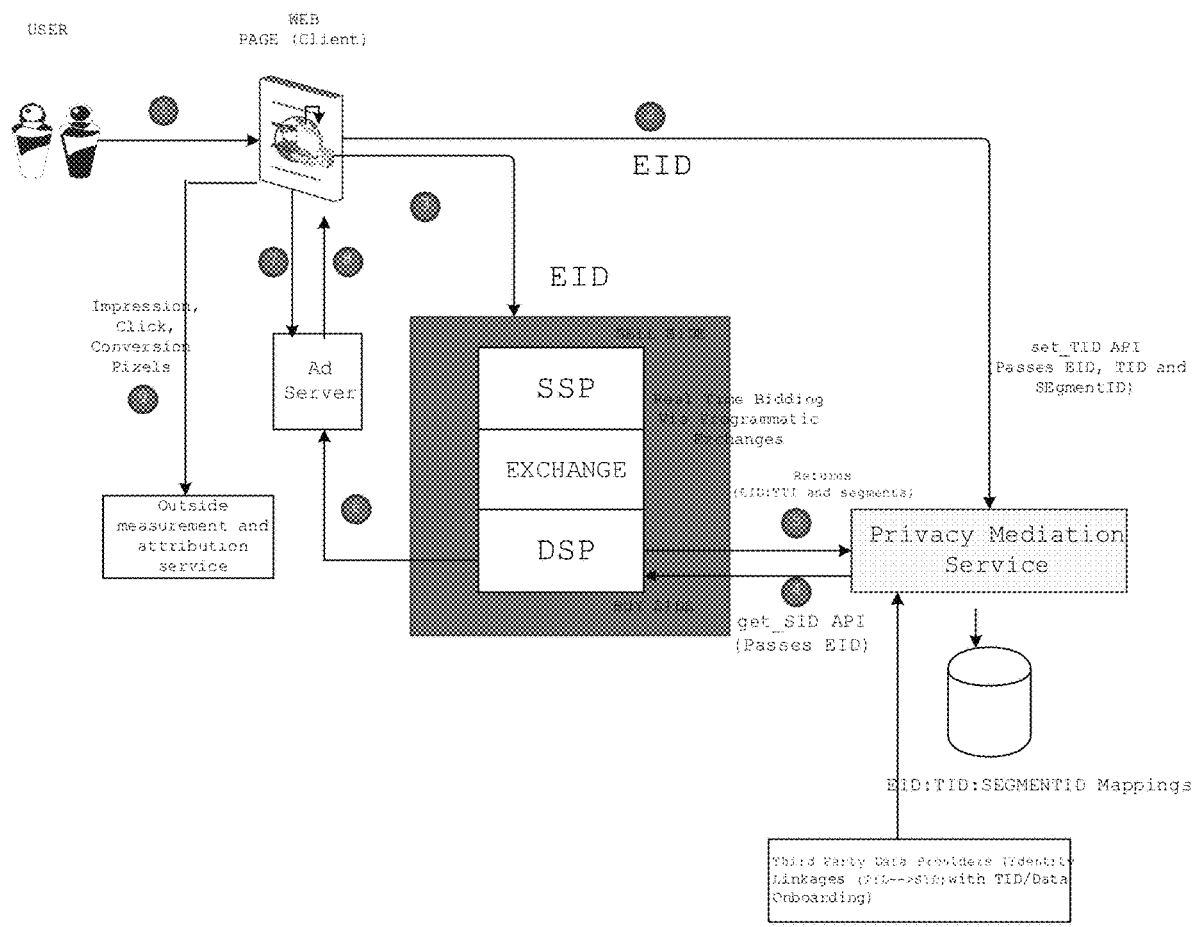
FIG. 3 illustrates a block diagram depicting an exemplary EID generation and data flow for RTB in a browser environment, in accordance with an embodiment of the present invention.

FIG. 3 illustrates a block diagram depicting an exemplary EID generation and data flow for RTB in a browser environment, in accordance with an embodiment of the present invention. When a user loads a web page, a piece of JavaScript that is embedded on the page may execute in the user's browser. The JavaScript may generate a temporary ID or EID. The EID may change or rotate on each page load. Publishers may fetch a contextID on page load before any advertising tag may be loaded. Publisher webserver may associate the EID together with a behavioral profile of the user in a first party domain cookie. In parallel, the publisher may also make an asynchronous call to a privacy mediation service via a web services API that may be provided by the privacy mediation service. In the asynchronous call, the publisher may pass a web user identity that the publisher has access and permissions to use for advertising purposes, along with any other third party data overlays to the web user identity. For example, without limitation, the publisher may pass the web user ID (TID) and keyword, both of which are relevant to describing the behavioral attributes of a web user's optional data such as, without limitation, age, gender, birth year, geographic data attributes, segment identifiers that correlate to the standard IAB content taxonomy or a third party content taxonomy, third party segment identifiers, URL, content category, and any other data attachments to the true web user identity. The privacy mediation service may use a shared database, or alternatively, for example, a distributed ledger, that the participants (i.e. publishers, identity providers, buy side platforms, etc.) have permissions to read or write to programmatically.

A database server may maintain the EID to TID mapping. The Privacy mediation service may also associate segment identifiers (SID) that indicate the audience classification to which the user belongs to the TID. The data may be stored in a decentralized data store that establishes trust in a network of known participants such as, without limitation, DSP's, media platforms, ad networks, measurement services, publishers, etc. depending on the implementation or a central database server. The network of participants may use the privacy mediation service, and the privacy mediation service may expose only the data it wants to share to the associated parties based on data contracts or rules that the privacy mediation service enforces. The database may store TID associations and maps EID to TID for publishers for every page load.

The privacy mediation service may include software and hardware components and a plurality of dispersed computing units that may be geographically dispersed in a plurality of central computing units (herein cloud servers or cloud infrastructure). The privacy mediation service may also include a plurality of decentralized distributed databases and web services API's. The main function of the privacy mediation service may be to resolve the EID to a TID of the user and also provide a unique measurement key (MID). The mediation service may also include a mapping of EID to any existing or future client or application, or system level identifiers, such as, without limitation, a browser ID, advertiser ID, or operating system. Such client, application, or system level identifiers may be used to identify the user.

Figure 4:
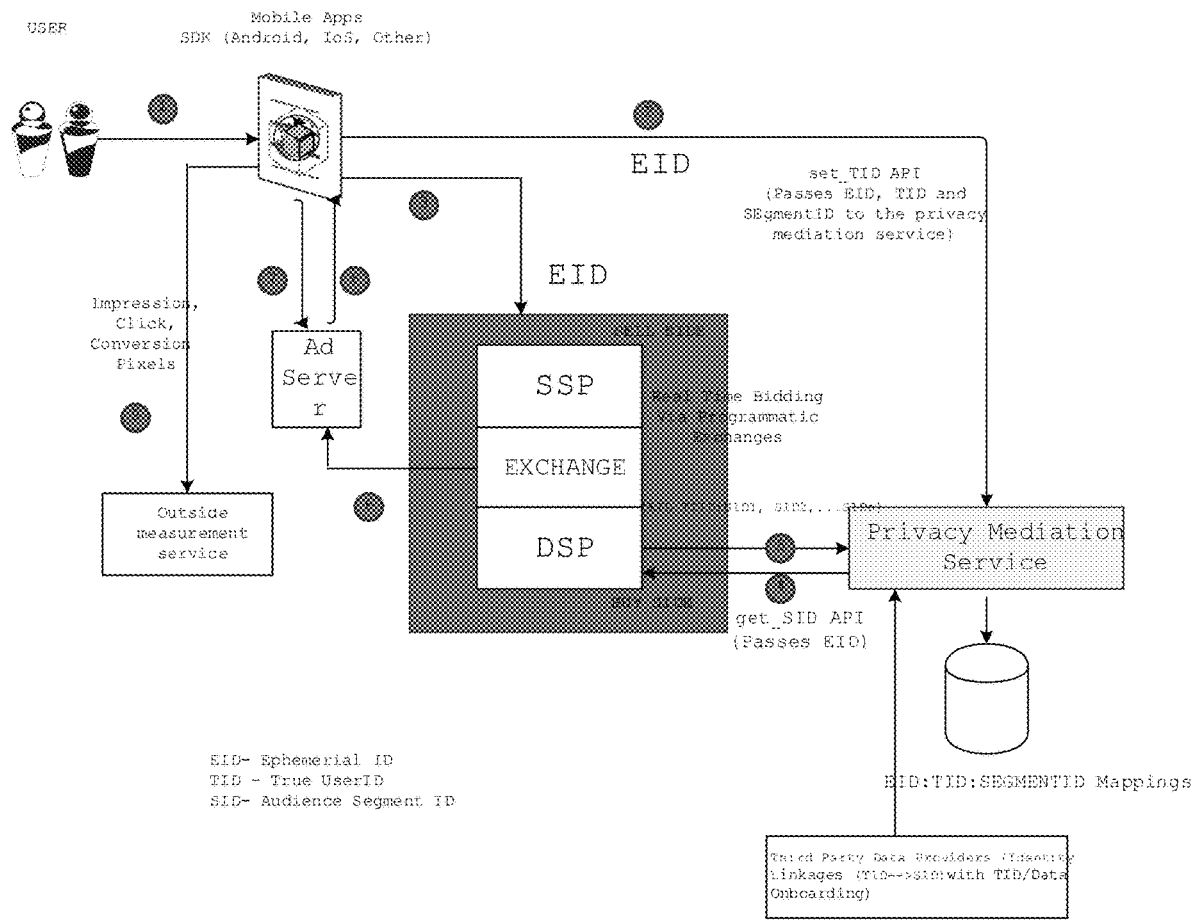
FIG. 4 illustrates a block diagram depicting an exemplary EID generation and data flow for RTB in a mobile app environment, in accordance with an embodiment of the present invention.

FIG. 4 illustrates a block diagram depicting an exemplary EID generation and data flow for RTB in a mobile app environment, in accordance with an embodiment of the present invention. The process for a web app environment may be substantially the same as in a browser environment except that when a user opens a mobile application, an SDK may generate an EID associated with the user.

Figure 5:
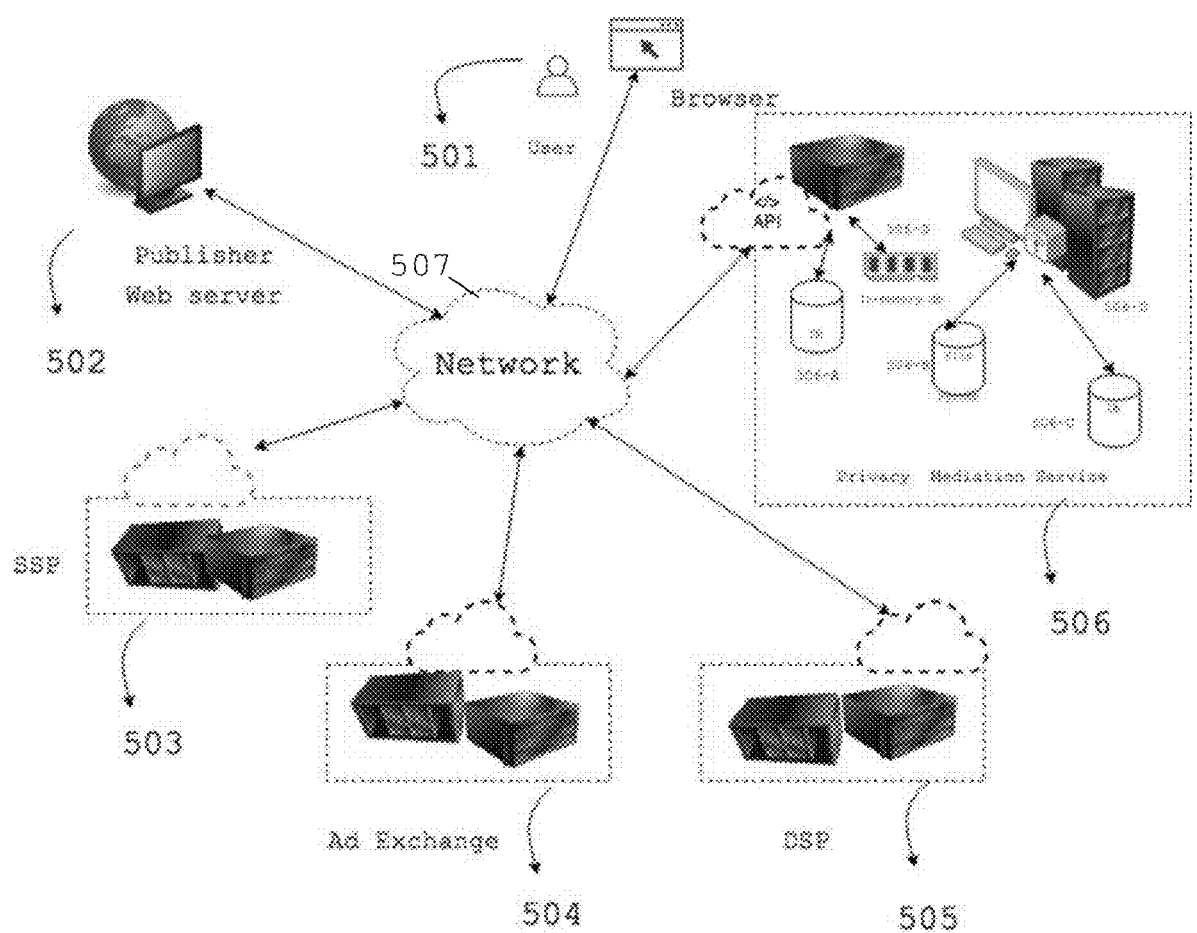
FIG. 5 illustrates a block diagram depicting exemplary computer systems, cloud infrastructure and a computer network, in accordance with an embodiment of the present invention.

FIG. 5 illustrates a block diagram depicting exemplary computer systems, cloud infrastructure and a computer network, in accordance with an embodiment of the present invention. User 501, publisher web server 502, SSP 503, Ad exchange 504, DSP 505, and privacy mediation service 506 may all be connected to network 507.

Figure 6:
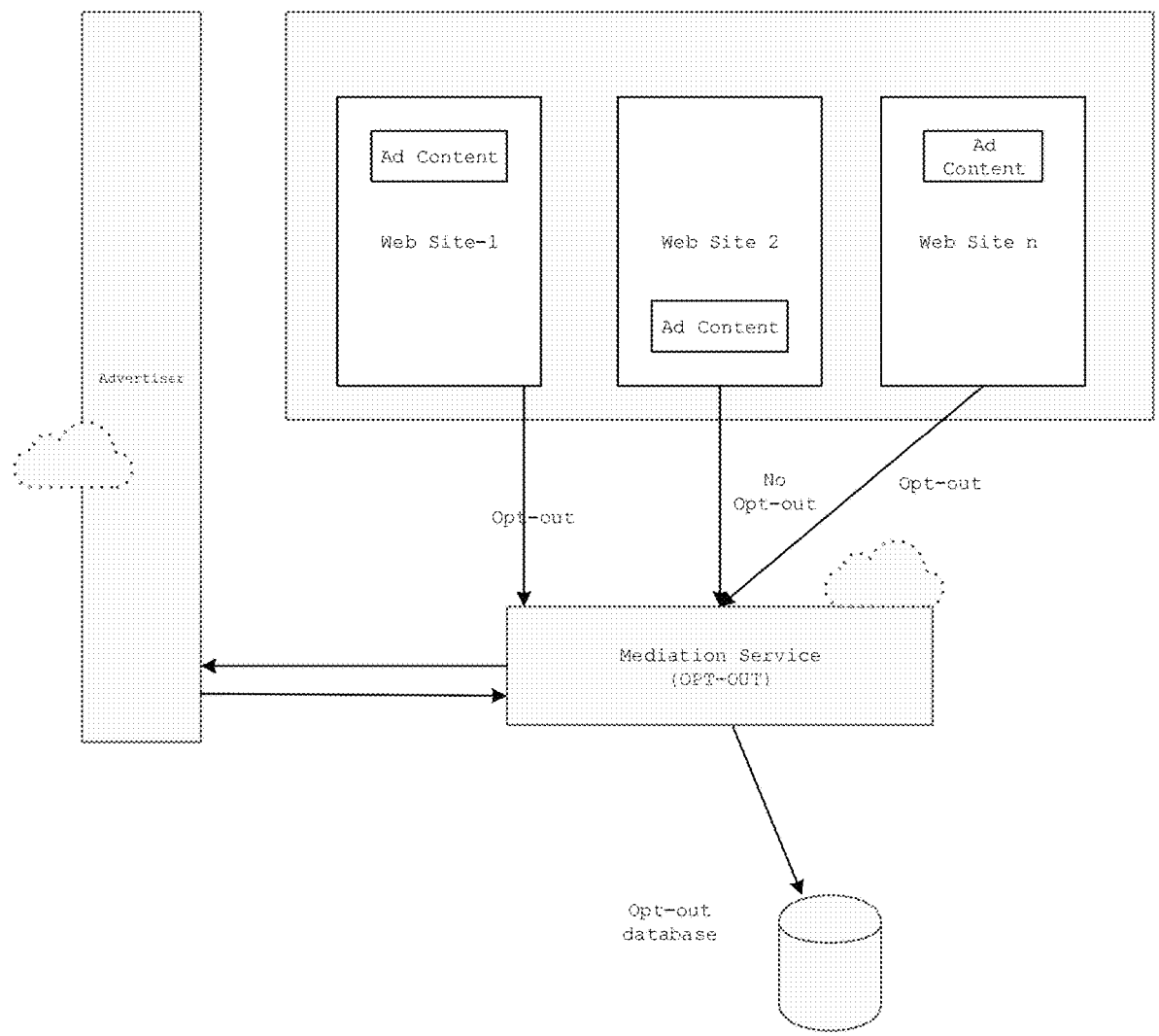
FIG. 6 illustrates a block diagram depicting exemplary systems involved in managing opt-out, in accordance with an embodiment of the present invention.

FIG. 6 illustrates a block diagram depicting exemplary systems involved in managing opt-outs, in accordance with an embodiment of the present invention. Users may opt out of interest based advertising for specific web sites. When an advertiser requests data segments corresponding to an EID, if the user is opted out of ad targeting for the web site, the mediation service will not return the data segments. The mediation service may maintain a central opt-out database. The opt-out database may maintain information on whether the user has opted out of targeted advertisements.

Figure 7:
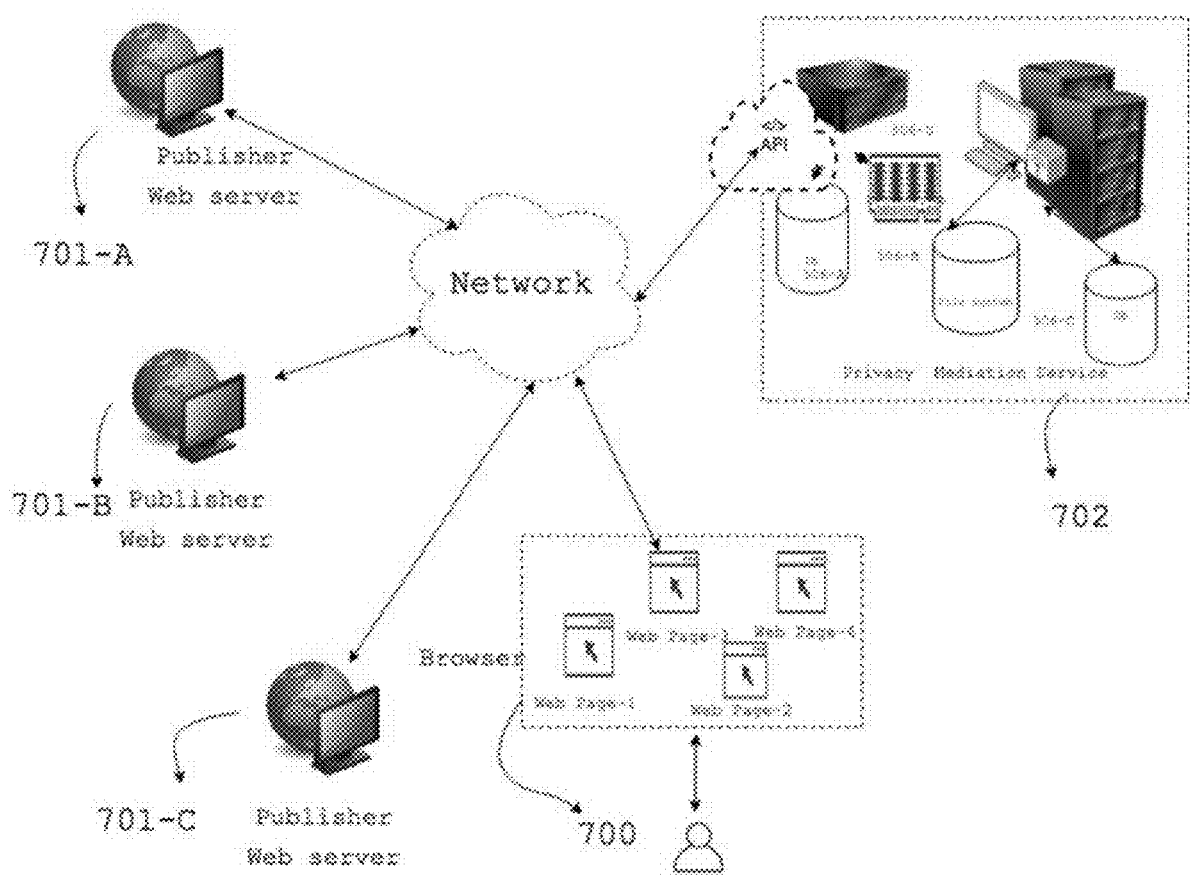
FIG. 7 illustrates a block diagram depicting exemplary computer systems and network and cloud systems involved in cross-site tracking, in accordance with an embodiment of the present invention.

FIG. 7 illustrates a block diagram depicting exemplary computer systems and network and cloud systems involved in cross-site tracking, in accordance with an embodiment of the present invention. Cross site user identification may also be handled. Web site owners or publishers may be assigned a publisher id (PubID) by the mediation service. The client side JavaScript library that the publisher incorporates on their webpages allows the publisher to pass the EID, the TID that the publisher uses to uniquely identify the user along with any other linkage keys to the TID. The linkage keys may be, for example, without limitation, a hashed version of offline identity data such as, without limitation, name, address, phone number, etc., a statistical identifier using techniques such as, without limitation, browser fingerprinting, HTML canvas fingerprinting, etc., any future persistent user identifiers such as, without limitation, a unique browser ID, persistent client side identifiers, etc., network level identifiers, such as, without limitation, Telco Network assigned identifier, etc.

The mediation service may maintain a database of TID, PubID, web address (URL), Unique-IAB audience or content taxonomy ID and a universally unique identifier (UUID), which may be generated by the mediation service. The UUID may be a persistent identifier that the mediation service maintains linking the TID obtained from multiple publishers. The linkage key may facilitate joining the TID's, giving a complete view of the user and their behavioral profile data. The mediation service may also maintain an in-memory database of UUID/TID to EID that are generated by the client side library for faster response times for RTB calls.

By maintaining a mapping of publisher provided Unique Identifiers, Linkage, keys and Unique ID based on IAB content taxonomy (Segment ID), users can be tracked across web sites for Advertisement purposes.

For example, the same user's identity may be obtained from multiple websites and each website may provide information on the user's interests (Unique IAB ID) based on their knowledge of the user. The mediation service database may link the data together to create a complete view of the customer's interest for interest based advertising.

The Segment (Interest data) may be attached to a temporary or short lived identifier, i.e. the EID, for Ad targeting use cases, preventing 3rd party advertising systems from storing the user data, thus providing a high degree of privacy and security for user data that is used for individual level behavioral advertising.

The user in the above example may be individual who is in an executive leadership and management role from the aviation industry who has affinity for luxury cars and is interested in fitness and exercise. This information may be provided by multiple sites based on behavioral data these entities hold on the user.

Figure 8:
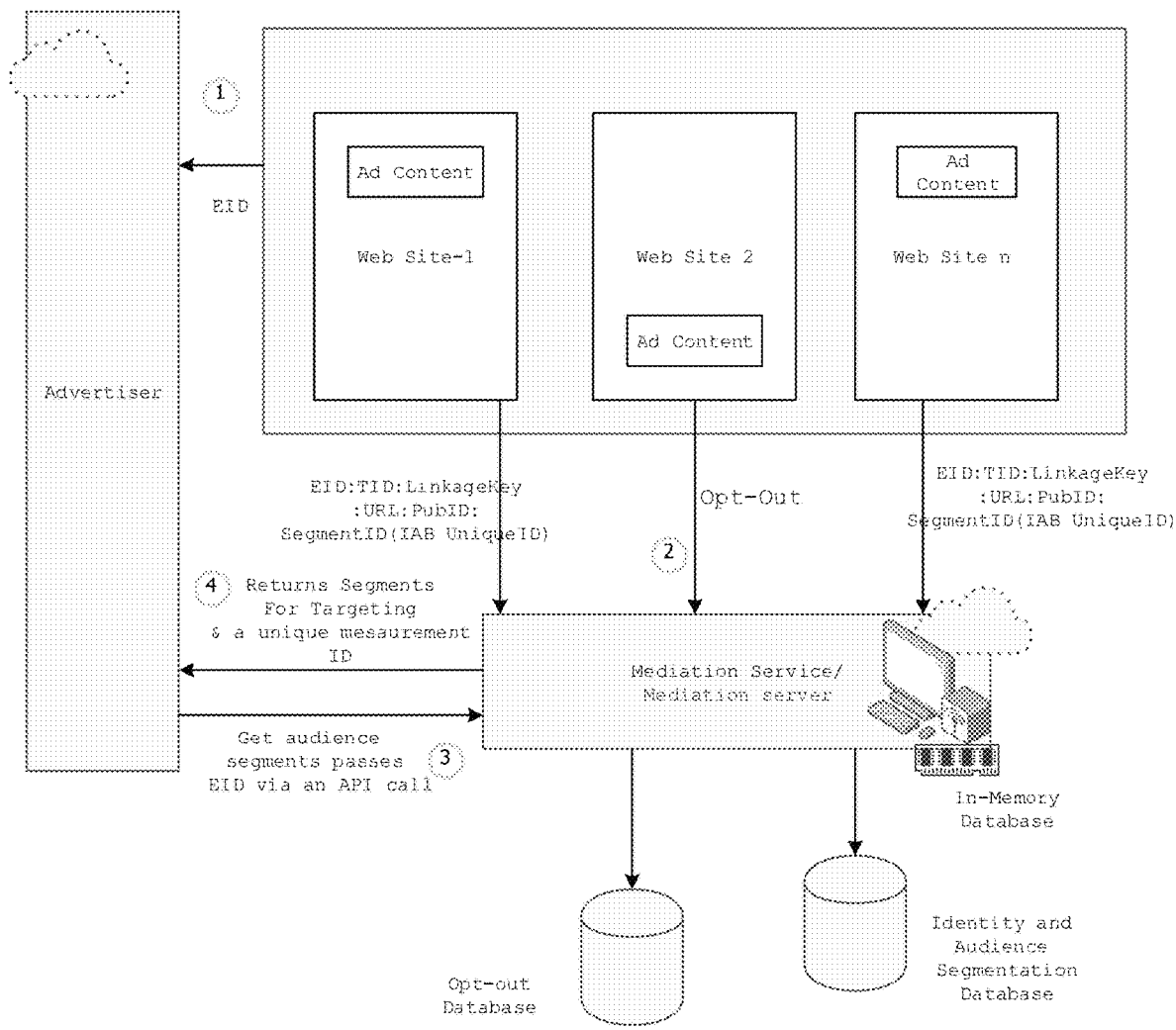
FIG. 8 illustrates a block diagram depicting exemplary cross-site tracking for interest based advertising with EID generation and a mediation server, in accordance with an embodiment of the present invention.

FIG. 8 illustrates a block diagram depicting exemplary cross-site tracking for interest based advertising with EID generation and a mediation server, in accordance with an embodiment of the present invention.

Frequency capping is a feature that limits the number of times a Display or Video ad appears to the same person. Advertisers currently manage the number of ads shown across sites by using 3rd party cookies. Cross-domain user ID, currently available via a third-party cookie, is read by a demand-side platform or an ad server to determine which ad should be delivered. The mediation service in the invention generates a unique measurement ID (MID) for the advertiser to uniquely identify the same person in order to limit the number of times Display or Video ad gets served. The MID is unique to the advertiser. In other words, Advertiser 1 and Advertiser 2 will see different measurement identifiers (MID) for the same user in order to prevent data sharing between multiple entities ensuring the highest privacy for user data.

Currently, third-party cookies are used to link ad exposure (measured in impressions or views) to user actions (clicks, purchases and page visits) on different websites. This allows measurement and attribution providers to provide multi-touch attribution—a method of marketing measurement that evaluates the impact of each in driving a conversion, thereby determining the value of that specific touch point. Without 3rd party cookies, it becomes difficult to correlate the user behavior on multiple web sites. The invention solves the problem since the mediation service provides a measurement ID (MID) that can be used to correlate the user behavior on multiple websites.

Figure 9:
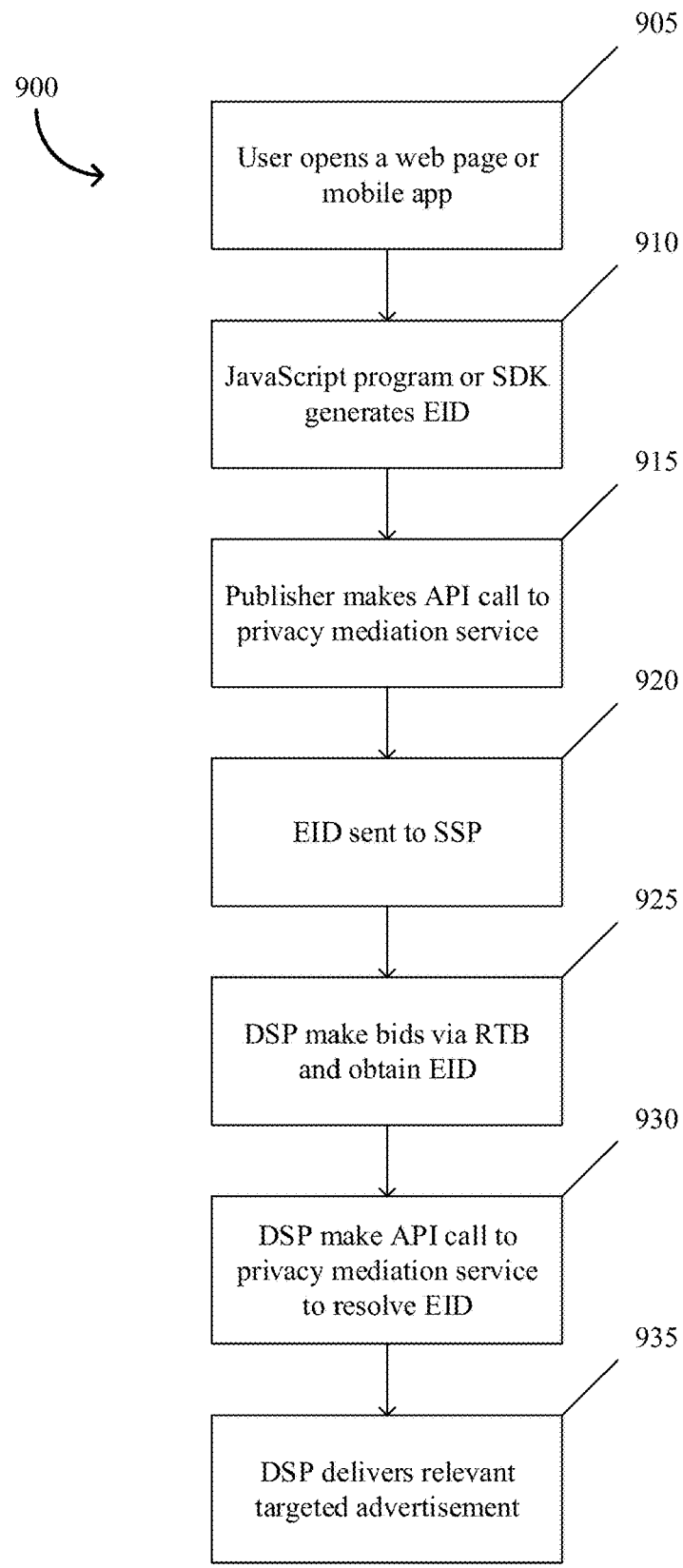
FIG. 9 illustrates a flow chart depicting an exemplary method for generating and using an EID, in accordance with an embodiment of the present invention.

FIG. 9 illustrates a flow chart depicting an exemplary method for generating and using an EID, in accordance with an embodiment of the present invention. Process 900 may begin with a step 905 where a user may open a web page or mobile app. Process 900 may then continue with a step 910 in which a JavaScript program (or if the user opened a mobile app, an SDK) may generate an EID. In parallel, a publisher may make an API call to a privacy mediation service in a step 915, passing for example, without limitation, the EID, a TID, associated audience segmentation data based on IAB taxonomy, and a linkage key, which may be, for example, without limitation, a hashed email, name, address, phone number, etc. Process 900 may then continue with a step 920, where the EID may be sent to an SSP. DSP's may then make bids via RTB and obtain the EID in a step 925. In a step 930 of process 900, the DSP may make an API call to the privacy mediation service which may resolve the EID to the TID and return the behavioral profile data as audience segments to the DSP. Finally, in a step 935 of process 900, the DSP bids for the impression.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied. Such computers referenced and/or described in this disclosure may be any kind of computer, either general purpose, or some specific purpose computer such as, but not limited to, a workstation, a mainframe, GPU, ASIC, etc. The programs may be written in C, or Java, Brew or any other suitable programming language. The programs may be resident on a storage medium, e.g., magnetic or optical, e.g., without limitation, the computer hard drive, a removable disk or media such as, without limitation, a memory stick or SD media, or other removable medium. The programs may also be run over a network, for example, with a server or other machine sending signals to the local machine, which allows the local machine to carry out the operations described herein.

Figure 10:
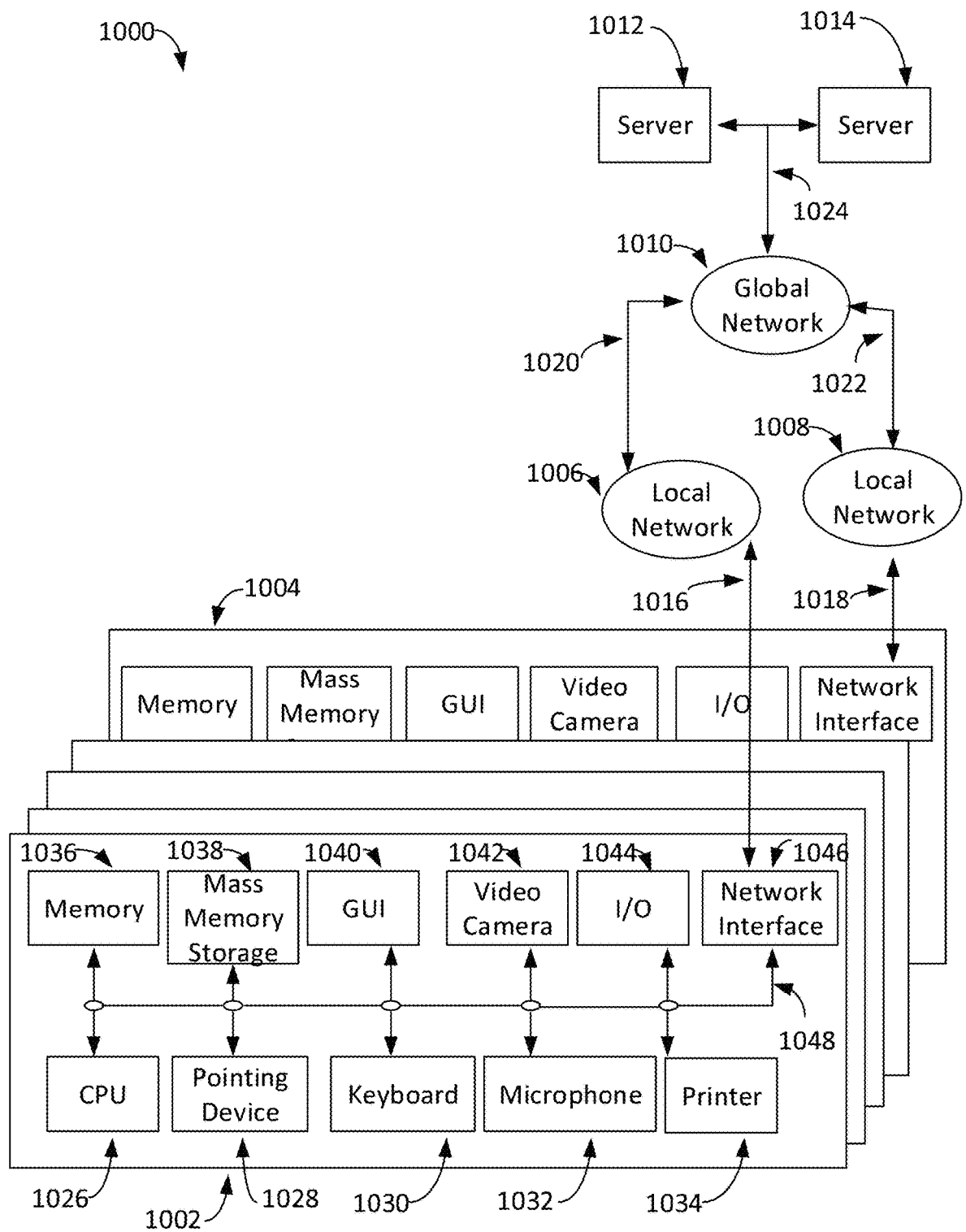
FIG. 10 is a block diagram depicting an exemplary client/server system which may be used by an exemplary web-enabled/networked embodiment of the present invention.

FIG. 10 is a block diagram depicting an exemplary client/server system which may be used by an exemplary web-enabled/networked embodiment of the present invention.

A communication system 1000 includes a multiplicity of clients with a sampling of clients denoted as a client 1002 and a client 1004, a multiplicity of local networks with a sampling of networks denoted as a local network 1006 and a local network 1008, a global network 1011 and a multiplicity of servers with a sampling of servers denoted as a server 1012 and a server 1014.

Client 1002 may communicate bi-directionally with local network 1006 via a communication channel 1016. Client 1004 may communicate bi-directionally with local network 1008 via a communication channel 1018. Local network 1006 may communicate bi-directionally with global network 1010 via a communication channel 1020. Local network 1008 may communicate bi-directionally with global network 1010 via a communication channel 1022. Global network 1010 may communicate bi-directionally with server 1012 and server 1014 via a communication channel 1024. Server 1012 and server 1014 may communicate bi-directionally with each other via communication channel 1024. Furthermore, clients 1002, 1004, local networks 1006, 1008, global network 1010 and servers 1012, 1014 may each communicate bi-directionally with each other.

In one embodiment, global network 1010 may operate as the Internet. It will be understood by those skilled in the art that communication system 1000 may take many different forms. Non-limiting examples of forms for communication system 1000 include local area networks (LANs), wide area networks (WANs), wired telephone networks, wireless networks, or any other network supporting data communication between respective entities.

Clients 1002 and 1004 may take many different forms. Non-limiting examples of clients 1002 and 1004 include personal computers, personal digital assistants (PDAs), cellular phones and smartphones.

Client 1002 includes a CPU 1026, a pointing device 1028, a keyboard 1030, a microphone 1032, a printer 1034, a memory 1036, a mass memory storage 1038, a GUI 1040, a video camera 1042, an input/output interface 1044 and a network interface 1046.

CPU 1026, pointing device 1028, keyboard 1030, microphone 1032, printer 1034, memory 1036, mass memory storage 1038, GUI 1040, video camera 1042, input/output interface 1044 and network interface 1046 may communicate in a unidirectional manner or a bi-directional manner with each other via a communication channel 1048. Communication channel 1048 may be configured as a single communication channel or a multiplicity of communication channels.

CPU 1026 may be comprised of a single processor or multiple processors. CPU 1026 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1036 is used typically to transfer data and instructions to CPU 1026 in a bi-directional manner. Memory 1036, as discussed previously, may include any suitable computer-readable media, intended for data storage, such as those described above excluding any wired or wireless transmissions unless specifically noted. Mass memory storage 1038 may also be coupled bi-directionally to CPU 1026 and provides additional data storage capacity and may include any of the computer-readable media described above. Mass memory storage 1038 may be used to store programs, data and the like and is typically a secondary storage medium such as a hard disk. It will be appreciated that the information retained within mass memory storage 1038, may, in appropriate cases, be incorporated in standard fashion as part of memory 1036 as virtual memory.

CPU 1026 may be coupled to GUI 1040. GUI 1040 enables a user to view the operation of computer operating system and software. CPU 1026 may be coupled to pointing device 1028. Non-limiting examples of pointing device 1028 include computer mouse, trackball and touchpad. Pointing device 1028 enables a user with the capability to maneuver a computer cursor about the viewing area of GUI 1040 and select areas or features in the viewing area of GUI 1040. CPU 1026 may be coupled to keyboard 1030. Keyboard 1030 enables a user with the capability to input alphanumeric textual information to CPU 1026. CPU 1026 may be coupled to microphone 1032. Microphone 1032 enables audio produced by a user to be recorded, processed and communicated by CPU 1026. CPU 1026 may be connected to printer 1034. Printer 1034 enables a user with the capability to print information to a sheet of paper. CPU 1026 may be connected to video camera 1042. Video camera 1042 enables video produced or captured by user to be recorded, processed and communicated by CPU 1026.

CPU 1026 may also be coupled to input/output interface 1044 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1026 optionally may be coupled to network interface 1046 which enables communication with an external device such as a database or a computer or telecommunications or internet network using an external connection shown generally as communication channel 1016, which may be implemented as a hardwired or wireless communications link using suitable conventional technologies. With such a connection, CPU 1026 might receive information from the network, or might output information to a network in the course of performing the method steps described in the teachings of the present invention.

Figure 11:
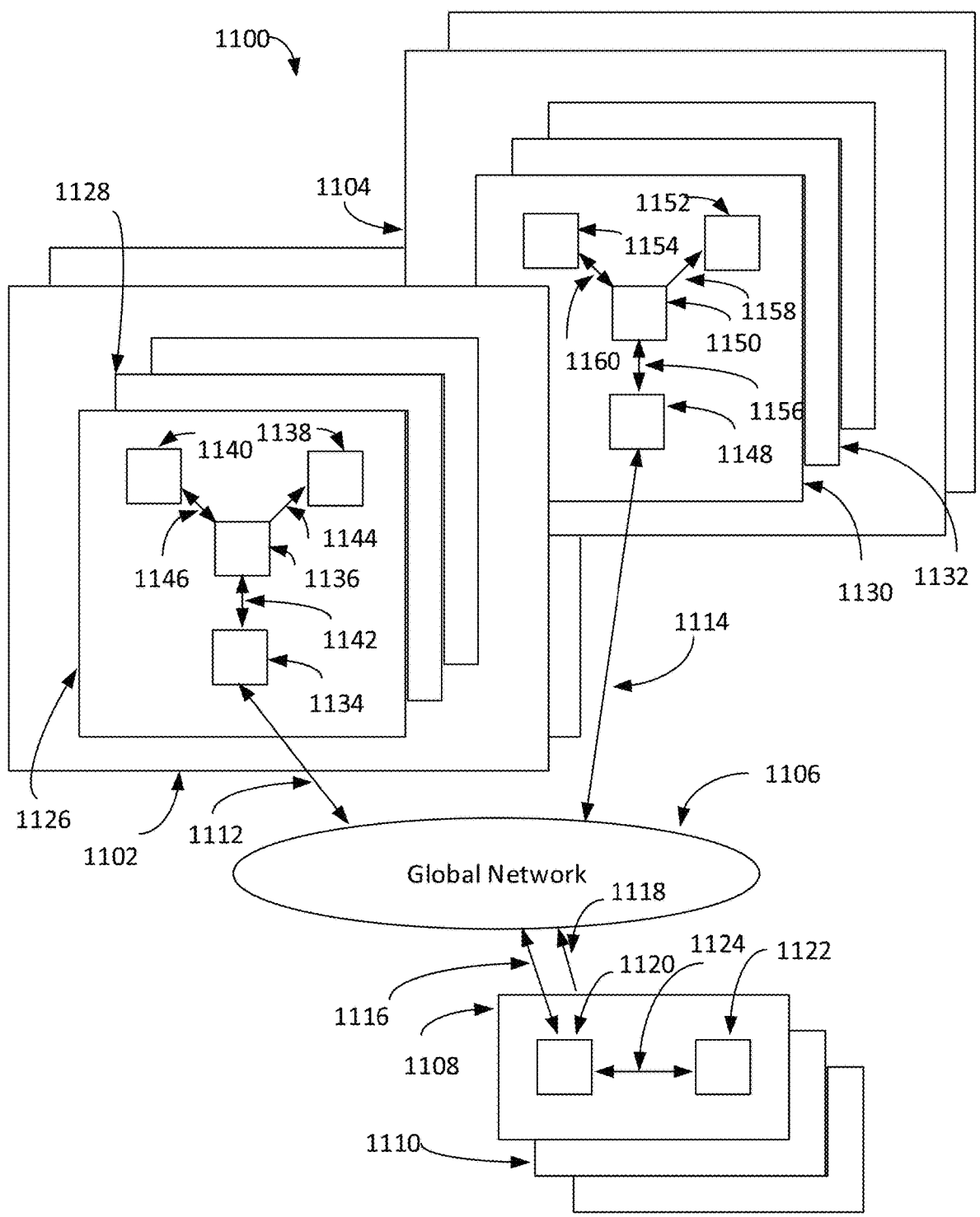
FIG. 11 illustrates a block diagram depicting a conventional client/server communication system, which may be used by an exemplary web-enabled/networked embodiment of the present invention.

FIG. 11 illustrates a block diagram depicting a conventional client/server communication system, which may be used by an exemplary web-enabled/networked embodiment of the present invention.

A communication system 1100 includes a multiplicity of networked regions with a sampling of regions denoted as a network region 1102 and a network region 1104, a global network 1106 and a multiplicity of servers with a sampling of servers denoted as a server device 1108 and a server device 1110.

Network region 1102 and network region 1104 may operate to represent a network contained within a geographical area or region. Non-limiting examples of representations for the geographical areas for the networked regions may include postal zip codes, telephone area codes, states, counties, cities and countries. Elements within network region 1102 and 1104 may operate to communicate with external elements within other networked regions or within elements contained within the same network region.

In some implementations, global network 1106 may operate as the Internet. It will be understood by those skilled in the art that communication system 1100 may take many different forms. Non-limiting examples of forms for communication system 1100 include local area networks (LANs), wide area networks (WANs), wired telephone networks, cellular telephone networks or any other network supporting data communication between respective entities via hardwired or wireless communication networks. Global network 1106 may operate to transfer information between the various networked elements.

Server device 1108 and server device 1110 may operate to execute software instructions, store information, support database operations and communicate with other networked elements. Non-limiting examples of software and scripting languages which may be executed on server device 1108 and server device 1110 include C, C++, C# and Java.

Network region 1102 may operate to communicate bi-directionally with global network 1106 via a communication channel 1112. Network region 1104 may operate to communicate bi-directionally with global network 1106 via a communication channel 1114. Server device 1108 may operate to communicate bi-directionally with global network 1106 via a communication channel 1116. Server device 1110 may operate to communicate bi-directionally with global network 1106 via a communication channel 1118. Network region 1102 and 1104, global network 1106 and server devices 1108 and 1110 may operate to communicate with each other and with every other networked device located within communication system 1100.

Server device 1108 includes a networking device 1120 and a server 1122. Networking device 1120 may operate to communicate bi-directionally with global network 1106 via communication channel 1116 and with server 1122 via a communication channel 1124. Server 1122 may operate to execute software instructions and store information.

Network region 1102 includes a multiplicity of clients with a sampling denoted as a client 1126 and a client 1128. Client 1126 includes a networking device 1134, a processor 1136, a GUI 1138 and an interface device 1140. Non-limiting examples of devices for GUI 1138 include monitors, televisions, cellular telephones, smartphones and PDAs (Personal Digital Assistants). Non-limiting examples of interface device 1140 include pointing device, mouse, trackball, scanner and printer. Networking device 1134 may communicate bi-directionally with global network 1106 via communication channel 1112 and with processor 1136 via a communication channel 1142. GUI 1138 may receive information from processor 1136 via a communication channel 1144 for presentation to a user for viewing. Interface device 1140 may operate to send control information to processor 1136 and to receive information from processor 1136 via a communication channel 1146. Network region 1104 includes a multiplicity of clients with a sampling denoted as a client 1130 and a client 1132. Client 1130 includes a networking device 1148, a processor 1150, a GUI 1152 and an interface device 1154. Non-limiting examples of devices for GUI 1138 include monitors, televisions, cellular telephones, smartphones and PDAs (Personal Digital Assistants). Non-limiting examples of interface device 1140 include pointing devices, mousse, trackballs, scanners and printers. Networking device 1148 may communicate bi-directionally with global network 1106 via communication channel 1114 and with processor 1150 via a communication channel 1156. GUI 1152 may receive information from processor 1150 via a communication channel 1158 for presentation to a user for viewing. Interface device 1154 may operate to send control information to processor 1150 and to receive information from processor 1150 via a communication channel 1160.

For example, consider the case where a user interfacing with client 1126 may want to execute a networked application. A user may enter the IP (Internet Protocol) address for the networked application using interface device 1140. The IP address information may be communicated to processor 1136 via communication channel 1146. Processor 1136 may then communicate the IP address information to networking device 1134 via communication channel 1142. Networking device 1134 may then communicate the IP address information to global network 1106 via communication channel 1112. Global network 1106 may then communicate the IP address information to networking device 1120 of server device 1108 via communication channel 1116. Networking device 1120 may then communicate the IP address information to server 1122 via communication channel 1124. Server 1122 may receive the IP address information and after processing the IP address information may communicate return information to networking device 1120 via communication channel 1124. Networking device 1120 may communicate the return information to global network 1106 via communication channel 1116. Global network 1106 may communicate the return information to networking device 1134 via communication channel 1112. Networking device 1134 may communicate the return information to processor 1136 via communication channel 1142. Processor 11116 may communicate the return information to GUI 1138 via communication channel 1144. User may then view the return information on GUI 1138.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6)/(f) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6) pre-AIA or 35 USC § 112 (f) post AIA.

It is noted that according to USA law, all claims must be set forth as a coherent, cooperating set of limitations that work in functional combination to achieve a useful result as a whole. Accordingly, for any claim having functional limitations interpreted under 35 USC § 112 (6)/(f) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6)/(f) is/(are) dependent on one or more remote servers located outside the USA, it is intended that each such recited function under 35 USC § 112 (6)/(f) is to be interpreted as the function of the local system receiving the remotely generated information required by a locally implemented claim limitation, wherein the structures and or steps which enable, and breath life into the expression of such functions claimed under 35 USC § 112 (6)/(f) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present patent application, and "35 USC § 112 (6)/(f)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing an automated buying and selling of online advertising according to the present invention will be apparent to those skilled in the art. Various aspects of the invention have been described above by way of illustration, and the specific embodiments disclosed are not intended to limit the invention to the particular forms disclosed. The particular implementation of the automated buying and selling of online advertising may vary depending upon the particular context or application. By way of example, and not limitation, the described in the foregoing were principally directed to online advertising implementations; however, similar techniques may instead be applied to home security systems, banking applications, health care records, social networks, eCommerce transactions, or other digital identity exchanges between online web or mobile applications, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre AIA) or 35 USC 112(f) post-AIA. Otherwise, no limitations from the specification are to be read into any claims, unless those limitations are expressly included in the claims.

What is claimed is:

1. A non-transitory computer-readable storage medium with a computer program code stored thereon, wherein the computer program code instructs a processor to perform a method comprising the steps of:

loading a web page;
executing a client library incorporated in said web page or a mobile application;
generating an ephemeral ID (EID) with said client library, in which said EID comprises a temporary ID that is generated by using a pseudorandom function that is configured to calculate said EID based on a linear congruential algorithm (LCG) for each loaded web page;
wherein an ephemeral ID (EID) is generated for each loaded web page or mobile application;
making an asynchronous application programming interface (API) call to a privacy mediation service;
transmitting said ephemeral ID (EID) to said privacy mediation service;
transmitting said ephemeral ID (EID) to a programmatic advertising supply side platform, wherein a buy side platform obtains said ephemeral ID (EID) via real time bidding (RTB) calls, said buy side platform makes an API call to said privacy mediation service, wherein said privacy mediation service generates a True ID (TID), resolves said ephemeral ID (EID) with the privacy mediation service generated True ID (TID), and returns a behavioral profile or data encoded as audience segment to said buy side platform for bidding purposes.

2. The method of claim 1, in which said client library comprises at least one of a JavaScript code and a software development kit (SDK).

3. The method of claim 2, in which at least one of said JavaScript code and software development kit (SDK) is configured to generate said EID.

4. The method of claim 3, further comprising the steps of transmitting an audience segmentation data to said mediation service.

5. The method of claim 4, in which said audience segmentation comprises a process of dividing website visitors into subgroups based on a common set of characteristics including at least one of, behavior, psychographics, demographics, and customer type.

6. The method of claim 5, in which said audience segmentation data is based on a standard taxonomy published by the Interactive Advertising Bureau (IAB).

7. The method of claim 3, further comprising the steps of transmitting a linkage key to said mediation service, wherein said linkage key facilitates linking said EID to a True ID (TID), giving a complete view of the user behavioral profile data.

8. The method of claim 7, in which said linkage key comprises a hashed version of offline identity data including at least one of, a name, an address, a phone number, and a statistical identifier.

9. The method of claim 8, in which said TID comprises an actual profile ID of a user including at least one of, an age, a gender, a birth year, and a geographic data attributes wherein said TID is assigned when the user visits the web page or the user registers for a service.

10. The method of claim 3, further comprising the steps of transmitting a True ID (TID) to the privacy mediation service, wherein said TID comprises an actual profile ID of a user.

11. A non-transitory computer-readable storage medium with a computer program code stored thereon, wherein the computer program code instructs a processor to perform a method comprising the steps of:

loading a web page;
executing a client library incorporated in said web page;
generating an ephemeral ID (EID) with said client library, in which said EID comprises a temporary ID that is generated by using a pseudorandom function that is configured to calculate said EID based on a linear congruential algorithm (LCG) for each loaded web page, wherein said EID changes or rotates on each loaded web page;
generating a True ID (TID), wherein said TID comprises an actual profile ID of a user;
making an asynchronous application programming interface (API) call to a privacy mediation service;
transmitting said generated True ID (TID);
transmitting said generated EID to said privacy mediation service;
transmitting said ephemeral ID (EID) to a programmatic advertising supply side platform, wherein a buy side platform obtains said ephemeral ID (EID) via real time bidding (RTB) calls, and wherein said buy side platform makes an API call to said privacy mediation service, in which said privacy mediation service resolves said ephemeral ID (EID) to a privacy mediation service generated TID and return a behavioral profile or data encoded as audience segment to said buy side platform for bidding purposes, wherein alternately said buy side platform makes a multi-set membership query of behavioral data attributes to said privacy mediation service, in which said privacy mediation service confirms or denies set membership of said behavioral data attributes to said buy side platform for bidding purposes.

12. The method of claim 11, in which said client library comprises at least one of a JavaScript code and a software development kit (SDK), in which at least one of said JavaScript code and software development kit (SDK) is configured to generate said EID.

13. The method of claim 12, further comprising the steps of transmitting an audience segmentation data to said mediation service, in which said audience segmentation comprises a process of dividing website visitors into subgroups based on a common set of characteristics including at least one of, behavior, psychographics, demographics, and customer type, in which said audience segmentation data is based on a standard taxonomy published by the Interactive Advertising Bureau (IAB).

14. The method of claim 11, further comprising the steps of transmitting a linkage key to said mediation service, wherein said linkage key facilitates linking said EID with a True ID (TID), giving a complete view of the user behavioral profile data.

15. The method of claim 14, in which said linkage key comprises a hashed version of offline identity data including at least one of, a name, an address, a phone number, and a statistical identifier.

16. The method of claim 11, wherein the buy side platform bid for an impression for an advertisement placement.

17. The method of claim 16, in which said actual profile ID of a user including at least one of, an age, a gender, a birth year, and a geographic data attributes, wherein said TID is assigned when the user visits the web page or the user registers for a service.

* * * * *